United States Patent [19]

Blount

[11] 4,451,638
[45] May 29, 1984

[54] PROCESS FOR THE PRODUCTION OF ALKALI METAL POLYESTER SILICATE RESINOUS PRODUCTS

[76] Inventor: David H. Blount, 5450 Lea St., San Diego, Calif. 92105

[21] Appl. No.: 122,015

[22] Filed: Feb. 19, 1980

Related U.S. Application Data

[63] Continuation-in-part of Ser. No. 010,061, Feb. 7, 1979, Pat. No. 4,200,697, which is a continuation-in-part of Ser. No. 794,915, May 9, 1977, Pat. No. 4,125,498, which is a continuation-in-part of Ser. No. 653,727, Jan. 30, 1976, abandoned, which is a continuation-in-part of Ser. No. 562,201, Apr. 14, 1975, abandoned.

[51] Int. Cl.$^3$ .............................................. C08G 65/38

[52] U.S. Cl. ........................... 528/205; 521/83; 521/88; 521/89; 521/91; 521/93; 521/92; 521/96; 521/95; 521/100; 521/114; 521/116; 521/117; 521/122; 521/128; 521/131; 521/124; 521/130; 521/155; 521/906; 525/28; 525/29; 525/43; 525/46; 525/48; 525/49; 525/440; 528/176; 528/192; 528/206; 528/425; 528/308

[58] Field of Search ................. 260/40 R, 37 N, 18 S, 260/40 TN; 521/83, 89, 88, 91, 93, 92, 96, 100, 95, 114, 116, 128, 117, 122, 131, 124, 130, 155, 906; 525/28, 29, 43, 46, 48, 49, 440; 528/176, 205, 192, 206, 308, 309, 425

[56] References Cited

U.S. PATENT DOCUMENTS 4,200,697 4/1980 Blount .................................... 521/83
4,211,848 7/1980 Blount .................................... 521/154

*Primary Examiner*—Melvyn I. Marquis

[57] ABSTRACT

Alkali metal polyester silicate resinous products are produced by mixing a polyhydroxy organic compound, an alkali metal silicate and a polycarboxylic acid, then heating the mixture to a temperature between the melting point of the polycarboxylic acid and the boiling temperature of the polyol while agitating until the reaction is complete.

6 Claims, No Drawings

PROCESS FOR THE PRODUCTION OF ALKALI METAL POLYESTER SILICATE RESINOUS PRODUCTS

CROSS-REFERENCE TO RELATED COPENDING APPLICATION

This application is a continuation-in-part of U.S. patent application, Ser. No. 10,061, filed Feb. 7, 1979, now U.S. Pat. No. 4,200,697 which is a continuation-in-part of U.S. patent application Ser. No. 794,915, filed May 9, 1977, now U.S. Pat. No. 4,125,498, which is a continuation-in-part of U.S. patent application, Ser. No. 653,727, filed Jan. 30, 1976, now abandoned, which is a continuation-in-part of U.S. patent application, Ser. No. 562,201, filed Apr. 14, 1975, now abandoned.

BACKGROUND OF THE INVENTION

This invention relates to a process for the production of alkali metal polyester silicate resinous products by chemically reacting a polyhydroxyl organic compound, a polycarboxylic acid compound and/or polycarboxylic acid anhydride and an alkali metal silicate.

For the purpose of this invention, the products produced by this instant process will be named alkali metal polyester silicate resinous products.

The alkali metal silicates will react chemically with both the polyhydroxyl organic compounds and the polycarboxylic acid compounds by heating and slowly adding an inorganic or an organic acid. Either saturated and/or unsaturated polyfunctional acids and alcohols may be reacted with alkali metal silicate to eventually cross-linked, three-dimensional esters. The unsaturated polyester silicate may be cured with a peroxide initiator. The polyfunctional acids and alcohols may be halogenated and may be aliphatic or aromatic.

The alkali metal polyester silicate resinous products may be used to make polyester silicate resinous products which may be utilized in coatings for wood, metal, linoleum, leather, fabrics and rubber. They may be utilized in paints, lacquers, metal primers, caulking compounds and water-emulsion paints. They may be copolymerized with a vinyl monomer to produce hard, solid, useful objects, or they may be used in conjunction with a reinforcing filler, such as glass fiber, paper or cloth to produce a laminate of outstanding strength and durability. They may be used as a molding powder, as an adhesive and as impregnants. They may be chemically reacted with polyisocyanates to produce polyurethane silicate resin and foams.

The alkali metal silicate resinous products may be utilized to produce polyester silicate resinous products and polyurethane silicate resinous products and foams. These foams may be used for thermal and sound insulation in homes, commercial buildings, airplanes, automobiles, home appliances, and packaging. They are soluble in solvents and may be used as adhesives and coating agents for wood, metal and plastics.

Alkali metal polyester silicate resinous products are produced by reacting the following components:
(a) an alkali metal silicate;
(b) a polyhydroxyl organic compound;
(c) a polycarboxylic acid and/or a polycarboxylic acid anhydride.

Polyester silicate resinous products may be produced by reacting the following components:
(a) an alkali metal silicate;
(b) a polyhydroxyl organic compound;
(c) a polycarboxylic acid and/or a polycarboxylic acid anhydride;
(d) a salt-forming compound.

Polyurethane silicate resinous products and foamed products may be produced by reacting the following components:
(1) an alkali metal polyester silicate resinous product;
(2) a polyisocyanate or polyisothiocyanate.

Component (a)

Any suitable alkali metal compound may be used in this invention, such as sodium silicate, potassium silicate, lithium silicate and mixtures thereof.

Sodium silicate is the preferred alkali metal silicate.

Component (b)

Suitable polyhydric alcohols include, but are not limited to, ethylene glycol; propylene-1,2- and -1,3-glycol; butylene-1,4- and -2,3-glycol; hexane-1,6-diol; octane-1,8-diol; neopentyl glycol; cyclohexanedimethanol-(1,4-bis-hydroxymethylcyclohexane); 2-methyl-propane-1,3-diol; diethylene glycol; triethylene glycol; tetraethylene glycol; polyethylene glycols; dipropylene glycol; polypropylene glycols; dibutylene glycol and polybutylene glycols. The unsaturated polyester resins may contain lactones such as $\epsilon$-caprolactone, or hydrocarboxylic acids such as $\omega$-hydroxy-caproic acid. Polyethers containing 2 hydroxyl groups may be used in production of unsaturated polyester resins and may be prepared, e.g., by the polymerization of epoxides, e.g., ethylene oxide, propylene oxide, butylene oxide, tetrahydrofuran, styreneoxide or epichlorohydrin, each with itself, e.g., in the presence of $BF_3$, or by addition of these epoxides, optionally as mixtures or successively, to starting components such as alcohols or amines, e.g., water; ethylene glycol; propylene-1,3- or -1,2-glycol; trimethylol propane; 4,4'-dihydroxydiphenylpropane; aniline; ammonia; ethanolamine or ethylenediamine. The polyethers may be modified with vinyl polymers such as those which may be obtained by polymerizing styrene or acrylonitrile in the presence of polyethers.

Other unsaturated alcohols may be reacted with dibasic acids; these include other polymeric allyl-type alcohols which are alcohols having a double bond of aliphatic character between two carbon atoms, one of which is attached directly to a saturated carbon atom, which, in turn, is attached directly to an alcoholic hydroxy group, as represented by the general structural formula:

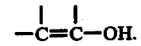

Alcohols embodying this structure may properly be termed "beta, gamma-olefinic monohydric alcohols". Allyl-type alcohols having a terminal methylene group attached by an olefinic double bond to a carbon atom which is attached directly to a saturated carbinol carbon are represented by the formula:

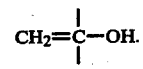

Component (c)

The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric acid fatty acid such as oleic acid, optionally mixed with monomeric fatty acids, dimethylterephthalate and bis-glycol terephthalate.

Long-chain unsaturated alkali metal polyester silicate resins may be made from dibasic acids and dihydric alcohols. Either the dibasic acid or the dihydric alcohol may be unsaturated. Usually a combination of unsaturated and saturated dibasic acids and dihydric alcohols is used to produce the unsaturated polyester resins. Instead of the dibasic acids, the corresponding polycarboxylic acid esters of lower alcohols or their mixtures may be used for preparing the unsaturated polyester resins.

Suitable dibasic acids may be aliphatic, cycloaliphatic, aromatic and/or heterocyclic and may be substituted, e.g., with halogen atoms. Examples of the dibasic acid and corresponding acid anhydride include, but are not limited to, succinic acid, adipic acid, suberic acid, azelaic acid, phthalic acid, sebacic acid, isophthalic acid, trimellitic acid, phthalic acid anhydride, tetrahydrophthalic acid anhydride, hexahydrophthalic acid anhydride, endomethylene tetrahydrophthalic acid anhydride, glutaric acid anhydride, maleic acid, maleic acid anhydride, fumaric acid, dimeric and trimeric fatty acids such as oleic acid, optionally mixed with monomeric fatty acids, dimethylterephthalate and bis-glycol terephthalate. An unsaturated dibasic acid such as maleic acid maleic acid anhydride, fumaric acid, itaconic acid or mixtures thereof must be included in the production of unsaturated alkali metal polyester silicate resins, except when an unsaturated alcohol is used.

The unsaturated polyester resins may be modified with polyacetals, polyester amides, polyamides, organic diisocyanates, natural polyols, e.g., castor oil and additional products of alkylene oxides with phenoformaldehyde resins or with ureaformaldehyde resins.

The unsaturated polyester resins may be modified by polymerable oils such as unsaturated fatty acids (or their esters), tung oil, linseed oil, heated linseed oil, soya bean oil, dehydrated castor oil, tall oil, cottonseed oil, sunflower oil, fish oil, perilla oil and safflower oil.

Suitable unsaturated alcohols such as allyl alcohol may be reacted with dibasic acids such as phthalic anhydride, succinic acid, maleic acid, maleic anhydride, itaconic acid and fumaric acid to produce allyl esters which may be polymerized alone or with other polymerizing monomers. Allyl esters such as diethylene glycol bis(allyl carbonate), diallyl maleate, diallyl fumarate, dially phthalate, diallyl benzene phosphonate, allyl itaconate and methallyl methacrylate may be used in this invention. Triallyl cyanurate may be reacted with unsaturated polyester resins to produce resins, and may be used as the polymerizing monomer.

Component (d)

Any suitable salt-forming compound may be utilized to react with the alkali metal radical in the alkali metal polyester silicate to produce polyester silicate resinous products. Suitable salt-forming compounds include mineral acids such as sulfuric acid, hydrochloric acid, phosphoric acid, and nitric acid, organic acids, such as acetic acid, hydrogen-containing acid salts such as sodium hydrogen sulfate and potassium hydrogen sulfate, organic acid halides, organic acid sulfates and mixtures thereof.

Any suitable polymerizing monomer may be used with the unsaturated polyester resin such as, but not limited to, vinyl monomers, allyl esters, triallyl cyanurate and mixtures thereof.

Styrene is the preferred polymerizing monomer and may be used alone or in combination with vinyl acetate. Other vinyl monomers may be used such as acrylic acid compounds and esters, vinyl toluene, divinyl benzene, acrylonitrile, methacrylonitrile, etc.

Activators and promoters, used in conjunction with the initiators such as cobalt which, in the form of its ethyl hexanoate or naphthenate salt, is a good, general-purpose activator for use with ketone peroxides, may be added to the unsaturated polyester resin. Concentration as low as 30 ppm of cobalt metal will activate a system. Other activators may be added to the unsaturated polyester resins such as tertiary dialkyl aryl amines, e.g., diethyl aniline, and aliphatic thiols, e.g., lauryl mercaptan, when acyl peroxides are used. When alkali metal or ammonium persulfates are used, ferric sulfate and cupric sulfate may be added to the unsaturated polyester resin.

An inhibitor, such as p-tert-butyl catechol, hydroquinone, p-nitrose dimethylaniline or similar compounds which will increase the lifetime of the unsaturated polyester resin, may be added to the unsaturated polyester resin.

Any suitable initiator which will promote the copolymerization of a solution of an unsaturated linear polymer in a liquid monomer may be used in this invention. The controlled polymerization of unsaturated polyester-monomer mixture, in order to yield fully cured solids, usually requires the use of an initiator.

Any suitable free-radical initiator, such as organic and inorganic peroxides, azo compounds, alkali metal persulfates, ammonium persulfate and mixtures thereof, may be used. The fact that the action of organic peroxide can be modified by activators and promoters, plus their ready availability at reasonable cost, makes them preferable in this invention. Thermal and photopolymerization may be used in certain cases.

Suitable organic peroxide initiators include, but are not limited to, acetyl benzoyl peroxide, peracetic acid, methyl ethyl ketone peroxide, cyclohexanone peroxide, cyclohexyl hydroperoxide, 2,4-dichlorobenzoyl peroxide, cumene hydroperoxide, tert-butyl hypoperoxide, methyl amyl ketone peroxide, lauroyl peroxide, benzoyl peroxide, tert-butyl perbenzoate, di-tert-butyl diperphthalate and mixtures thereof.

Promoters used with acyl peroxide include tertiary dialkyl aryl amines, such as diethyl aniline, and aliphatic thiols, as for example, lauryl mercaptan. Concentrations used are most often in the range of 0.05% to 0.5% of active substance. Promoters usually are strong reducing agents and initiators are strong oxidizing agents.

Suitable alkali metal persulfates include potassium and sodium persulfate. Redox systems may also be utilized in this invention.

The alkali metal polyester silicate resinous product will react chemically with suitable polyisocyanates and/or polyisothiocyanates to produce resinous products and foams.

Any suitable organic polyisocyanate may be used according to the invention, including aliphatic, cycloaliphatic, araliphatic, aromatic and heterocyclic polyisocyanates and mixtures thereof. Suitable polyisocyanates which may be employed in the process of the invention are exemplified by the organic diisocyanates which are compounds of the general formula:

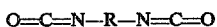

where R is a divalent organic radical such as an alkylene, aralkylene or arylene radical. Such suitable radicals may contain, for example, 2 to 20 carbon atoms. Examples of such diisocyanates are:
tolylene diisocyanate,
p,p'-diphenylmethane diisocyanate (sic),
phenylene diisocyanate,
m-xylylene diisocyanate,
chlorophenylene diisocyanate,
benzidene diisocyanate,
naphthylene diisocyanate,
decamethylene diisocyanate,
hexamethylene diisocyanate,
pentamethylene diisocyanate,
tetramethylene diisocyanate,
thiodipropyl diisocyanate,
propylene diisocyanate,
ethylene diisocyanate.

Other polyisocyanates, polyisothiocyanates and their derivatives may be equally employed. Fatty diisocyanates are also suitable and have the general formula:

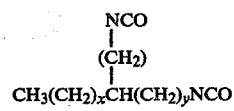

where x+y totals 6 to 22 and z is 0 to 2, e.g., isocyanastearyl isocyanate.

It is generally preferred to use commercially readily available polyisocyanates, e.g., tolylene-2,4- and -2,6-diisocyanate and any mixtures of these isomers ("TDI"), polyphenyl-polymethylene-isocyanates obtained by aniline-formaldehyde condensation followed by phosgenation ("crude MDI"), and modified polyisocyanate containing carbodiimide groups, allophanate groups, isocyanurate groups, urea groups, imide groups, amide groups or biuret groups, said modified polyisocyanates prepared by modifying organic polyisocyanates thermally or catalytically by air, water, urethanes, alcohols, amides, amines, carboxylic acids, or carboxylic acid anhydrides, phosgenation products of condensates of aniline or anilines alkylsubstituted on the nucleus, with aldehyde or ketones may be used in this invention. Solutions of distillation residues accumulating during the production of tolylene diisocyanates, diphenyl methane diisocyanate, or hexamethylene diisocyanate, in monomeric pollyisocyanates or in organic solvents or mixtures thereof may be used in this invention. Organic triisocyanates such as triphenylmethane triisocyanate may be used in this invention. Cycloaliphatic polyisocyanates, e.g., cyclohexylene-1,2-; cyclohexylene 1,4-; and methylene-bis-(cyclohexyl-4,4') diisocyanate may be used in this invention. Suitable polyisocyanates which may be used according to the invention are described, e.g., by W. Siefkin in Justus Liebigs Annalen der Chemie, 562, pages 75 to 136. Inorganic polyisocyanates are also suitable according to the invention.

Organic polyhydroxyl compounds (polyols) may be used in this invention with polyisocyanates or may be first reacted with a polyisocyanate to produce isocyanate-terminated polyurethaneprepolymers and then also used in this invention.

Reaction products of from 50 to 99 mols of aromatic diisocyanates with from 1 to 50 mols of conventional organic compounds with a molecular weight of, generally, from about 200 to about 10,000 which contain at least two hydrogen atoms capable of reacting with isocyanates, may also be used. While compounds which contain amino groups, thiol groups, carboxyl groups or silicate groups may be used, it is preferred to use organic polyhydroxyl compounds, in particular, compounds which contain from 2 to 8 hydroxyl groups, especially those with a molecular weight of from about 800 to about 10,000 and preferably from about 1,000 to about 6,000, e.g., polyesters, polyethers, polythioethers, polyacetals, polycarbonates or polyester amides containing at least 2, generally from 2 to 8, but preferably dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated; examples includes: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bis-glycol terephthalate. Any suitable polyhydric alcohol may be used such as, for example, ethylene glycol; propylene-1,2- and -1,3-glycol; butylene-1, 4- and -2,3-glycol; hexane-1,6-diol; octane-1,8-diol; neopentyl glycol, cyclohexanedimethanol-(1,4-bis-hydroxymethylcyclohexane); 2-methylpropane-1,3-diol; glycerol; trimethylol propane; hexane-1,2,6-triol; butane-1,2,4-triol; trimethylol ethane; pentaerythritol; quinitol; mannitol and sorbitol; methylglycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as $\epsilon$-caprolactone, or hydroxycarboxylic acid such as $\omega$-hydroxycaproic acid, may also be used.

The polyethers with at least 2, generally from 2 to 8 and preferably 2 or 3, hydroxyl group used according to the invention are known and may be prepared, e.g., by the polymerization of epoxides, e.g., ethylene oxide propylene oxide, butylene oxide, tetrahydrofuran oxide, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenylpropane, aniline, ammonia, ethanolamine or ethylenediamine; sucrose polyethers such as those described, e.g., in German Auslegeschriften Nos. 1,176,358 and 1,064,938 may also be used according to the invention. It is frequently preferred to use polyethers which contain predominantly primarily OH groups (up to 90% by weight, based on the total OH groups contained in the polyether). Polyethers modified with vinyl polymers such as those which may be obtained by polymerizing styrene or acrylonitrites in the presence of polyethers, (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythio-mixed ethers or polythioether ester amides, depending on the co-component.

The polyacetals used may be, for example, the compounds which may be obtained from glycols, 4,4'-dihydroxydiphenylmethylmethane, hexanediol, and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1, 3-diol; butane-1, 4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides any polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with ureaformaldehyde resins are also suitable for the purpose of the invention.

Organic hydroxyl silicate compound as produced in U.S. Pat. No. 4,139,549 may also be used in this invention.

Examples of these compounds which are to be used according to the invention have been described in High Polymers, Volume XVI, "Polyurethanes, Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199; and in Kunststoff-Handbuch, Volume VII, Vieweg-Hochtlen, Carl-Hanser-Verlag, Munich, 1966, on pages 45 to 71.

If the polyisocyanates or the prepolymer which contains NCO groups have a viscosity above 2000 cP at 25° C., it may be advantageous to reduce the viscosity thereof by mixing it with a low-viscosity organic polyisocyanate and/or an inert blowing agent or solvent.

Inorganic polyisocyanates and isocyanate-terminated polyurethane silicate prepolymers may also be used in this invention.

Polyisocyanate curing agents and/or polyisocyanates activators (catalysts) may be used in the process of producing poly(urethane silicate) resinous or foamed products. The following are examples of polyisocyanate curing agents and activators:
1. Water.
2. Water containing 10% to 70% by weight of an alkali metal silicate, such as sodium and/or potassium silicate. Crude commercial alkali metal silicate may contain other substances, e.g., calcium silicate, magnesium silicate, borates or aluminates and may also be used. The molar ratio of $Me_2OSiO_2$ (Me=metal) is not critical and may vary within the usual limits, but is preferably between 4 to 1 and 0.2 to 1.
3. Water containing 20% to 50% by weight of ammonium silicate.
4. Water containing 5% to 40% by weight of magnesium oxide in the form of a colloidal dispersion.
5. Alkali metal metasilicate such as sodium metasilicate, potassium metasilicate and commercial dry granular sodium and potassium silicates. Heating is required to start the curing reaction.
6. Water containing 20% to 70% by weight of silica sol.
7. Activators (catalysts) which act as curing agents and are added to the polyurethane silicate prepolymer in the amount of 0.001% to 10% by weight. They may be added in water.
   (a) Tertiary amines, e.g., triethylamine; tributylamine; N-methyl-morpholine; N-ethylmorpholine; N,N,N',N'-tetramethylenediamine; 1,4-diazo-bicyclo-(2,2,2)-octane; N-methyl-N'-dimethylaminoethyl piperazine; N,N-dimethylbenzylamine; bis(N,N-diethylaminoethyl)adipate; N-N-diethylbenzylamine; pentamethyldiethylenetriamine; N,N-dimethylcyclohexylamine; N,N,N',N'-tetramethyl-1,3-butanediamine; N,N-dimethyl-betaphenylethylamine; and 1,2-dimethylimidazole. Suitable tertiary amine activators which contain hydrogen atoms which are reactive with isocyanate groups include, e.g., triethanolamine; triisopanolamine; N,N-dimethylethanolamine; N-methyl-diethanolamine; N-ethyldiethanolamine; and their reactive products with alkylene oxides, e.g., propylene oxide and/or ethylene oxide and mixtures thereof.
   (b) Organo-metallic compounds, prefrably organo-tin compounds such as tin salts of carboxylic acid, e.g., tin acetate, tin octoate, tin ethyl hexoate, and tin laurate and the dialkyl tin salts of carboxylic acids, e.g., dibutyl tin diacetate, dibutyl tin dilaurate, dibutyl tin maleate or diocyl tin diacetate.
   (c) Silaamines with carbon-silicon bonds as described, e.g., in British Patent, No. 1,090,589, may also be used as activators, e.g., 2,2,4-trimethyl-1,2-silamorpholine or 1,3-diethylaminoethyl-tetramethyldisiloxane.
   (d) Other examples of catalysts which may be used according to the invention, and details of their action, are described in Kunststoff-Handbuch, Volume VII, published by Vieweg and Hochtlen, Carl-Hanser-Verlag, Munich, 1966, e.g., on pages 96 and 102.
8. Water containing 1% to 10% by weight of bases which contain nitrogen such as tetraalkyl ammonium hydroxides.
9. Water containing 1% to 10% by weight of alkali metal hydroxides such as sodium hydroxide; alkali metal phenolates such as sodium phenolate or alkali metal alcoholates such as sodium methylate.
10. Water containing sodium polysulfide in the amount of 1% to 10% by weight.

11. Water containing 20% to 70% by weight of a water-binding agent, being capable of absorbing water to form a solid or a gel, such as hydraulic cement, synthetic anhydrite, gypsum or burnt lime.
12. Mixtures of the above curing agents.

Surface-active additives (emulsifiers and foam stabilizers) may also be used according to the invention. Suitable emulsifiers are, e.g., the sodium salts of ricinoleic sulphonates or of fatty acid, or salts of fatty acids with amines, e.g., oleic acid diethylamine or stearic acid diethanolamine. Other surface-active additives are alkali metal or ammonium salts of sulphonic acids, e.g., dodecylbenzine sulphonic acid or dinaphthyl methane disulphonic acid; or of fatty acids, e.g., ricinoleic acid, or of polymeric fatty acids.

The foam stabilizers used are mainly water-soluble polyester siloxanes. These compounds generally have a polydimethylsiloxane group attached to a copolymer of ethylene oxide and propylene oxide. Foam stabilizers of this kind have been described, e.g., in U.S. Pat. No. 3,629,308. These additives are preferably used in quantities of 0% to 20%, but preferably 0.01% to 20%, by weight, based on the reaction mixture.

Negative catalysts, for example, substances which are acidic in reaction, e.g., hydrochloric acid or organic acid halides, known cell regulators, e.g., paraffins, fatty alcohols or dimethyl polysiloxanes, pigments or dyes, known flame-retarding agents, e.g., tris-chloroethylphosphate or ammonium phosphate and polyphosphates, stabilizers against aging and weathering plasticizers, fungicidal and bacteriocidal substances and fillers, e.g., barium sulphate, kieselguhr, carbon black or whiting, may also be used according to the invention.

Further examples of surface additives, foam stabilizers, cell regulators, negative catalysts, stabilizers, flame-retarding substances, plasticizers, dyes, fillers and fungicidal and bacteriocidal substances and details about methods of using these additives and their action may be found in Kunststoff-Handbuch, Volume VI, published by Vieweg and Hochtlen, Carl-Hanser-Verlag, Munich 1966, e.g., on pages 103 to 113. The halogenated paraffins and inorganic salts of phosphoric acid are the preferred fire-retarding agents.

The preferred curing agent is an aqueous solution of silicates, sodium silicate and/or potassium silicate in water which are normally known as water glass. Aqueous solutions of silicates may be prepared in the form of 25% to 54% silicates. Silica sols which may have an alkaline or acid pH may also be used; they should have solid contents of 15% to 50%. Silica sols are generally used in combination with aqueous silicate solutions. The choice of concentration depends mainly on the desired end product. Compact materials or materials with closed cells are preferably produced with concentrated silicated solutions which, if necessary, are adjusted to a lower viscosity by addition of alkali metal hydroxide. Solutions with concentrations of 40% to 70% by weight can be prepared in this way. On the other hand, to produce open-celled, light-weight foams, it is preferred to use silicate solutions with concentrations of 20% to 45% by weight in order to obtain low viscosities, sufficiently long reaction times and low unit weights. Silicate solutions with concentrations of 15% to 45% are also preferred when substantial quantities of finely divided inorganic fillers are used.

Suitable flame-resistant compounds may be used in the products of this invention such as those which contain halogen or phosphorus, e.g., tributylphosphate; tris(2,3-dichloropropyl)phosphate; polyoxypropylene-chloromethylphosphonate; cresyldiphenylphosphate; tricresylphosphate; tris-(beta-chloroethyl)phosphate; tris-(2,3-dichloropropyl)-phosphate; triphenyl-phosphate; ammonium phosphate; perchloroinated diphenyl phosphate; perchlorinated terephenyl phosphate; hexabromocyclodecane; tribromophenol; dibromopropyldiene, hexabromobenzene; octabromodiphenylether; pentabromotoluol; poly-tribromostyrol; tris-(bromocresyl)-phosphate; tetrabromobis-phenol A; tetrabromophthalic acid anhydride; octabromodiphenyl phosphate; tri-(dibromopropyl)-phosphate; calcium hydrogen phosphate; sodium or potassium dihydrogen phosphate; disodium or dipotassium hydrogen phosphate; ammonium chloride; phosphoric acid; polyvinylchloride tetomers chloroparaffins as well as further phosphorus- and/or halogen-containing flame-resistant compounds as they are described in Kunststoff-Handbuch, Volume VII, Munich, 1966, pages 110 and 111, which are incorporated herein by reference. The organic halogen-containing components are, however, preferred in the polyurethane silicate products.

The object of the present invention is to provide a novel process to produce alkali metal polyester silicate resinous products. Another object is to produce alkali metal polyester silicate resinous products which will react with a salt-forming compound to produce polyester silicate resinous products. A further object is to produce alkali metal polyester silicate resinous products which will react with polyisocyanates to produce resinous and foamed products that may be used as coating agents and thermal- and sound-insulation materials. Another object is to produce polyurethane silicate foamed products which have excellent flame-retardant properties.

DETAILED DESCRIPTION OF THE INVENTION

I have discovered that an alkali metal polyester silicate resinous product may be produced by reacting a alkali metal silicate, a polyhydroxy organic compound and a polycarboxylic acid and/or a polycarboxylic anhydride.

The preferred method is to mix, simultaneously, Component (a), an alkali metal silicate, Component (b), a polyhydroxyl organic compound and Component (c), a polycarboxylic acid and/or a polycarboxylic anhydride, then to heat the mixture to a temperature between the melting temperature of the polycarboxylic acid and the boiling temperature of the polyhydroxyl organic compound while agitating for 20 to 90 minutes, thereby producing an alkali metal polyester silicate resinous product.

The components may be mixed in any suitable manner; they may be pre-reacted to produce alkali metal hydroxyl organic silicates or alkali metal carboxylic acid silicates, then reacted with the other component.

The reactions of this invention may take place under any suitable physical conditions. While most of the reactions will take place at ambient pressure, in certain cases, a pressure either lower than, or above, ambient pressure may give better results. It may be preferable in certain cases to use temperatures above the polyol's boiling temperature after a partial reaction has taken place in order to speed up the chemical reaction. The temperature usually ranges between 150° C. and 250° C.

The ratios of the essential reactants and optional reactants which lead to the alkali metal polyester silicate resinous product of this invention may vary, broadly speaking, within ranges as follows:
(a) 1 to 10 parts by weight of alkali metal;
(b) 10 to 30 parts by weight of a polyhydroxyl organic compound;
(c) 10 to 30 parts by weight of a polycarboxylic acid and/or polycarboxylic acid anhydride.

Alkali metal polyester silicates will react chemically with polyisocyanates and/or polyisothiocyanates in order to produce a polyurethane silicate resinous product or foam.

The preferred method to produce alkali metal polyurethane silicate resinous or foam products is to mix thoroughly 1 to 95 parts by weight of the alkali metal polyester silicate resinous product with 50 parts by weight of a polyisocyanate or polyisothiocyanate at a temperature between 20° C. and 45° C. and at a suitable pressure, preferably ambient, optionally adding catalyst (activator), foam stabilizers, blowing agent, polyols and fillers. The optional additives may be premixed with the suitable component. The blowing agent may be added with the alkali metal polyester or polyisocyanate and the remaining additives are added with the alkali metal polyester silicate resinous product. A salt-forming compound may also be added in such a ratio that the salt-forming compound radicals are about equal to, or less than, the alkali metal radicals.

The polyisocyanate may be reacted with a polyol to produce an isocyanate-terminated polyurethane prepolymer and used in place of, or with, the polyisocyanate to react with the alkali metal polyester silicate to produce a polyurethane silicate resinous or foamed product.

Water-binding agents may be optionally added with the alkali metal polyester silicate, activator and polyisocyanate to produce a rigid foamed polyurethane silicate product which is then wet with water to cure the water-binding agent.

The ratios of the essential reactants and optional reactants which lead to the polyurethane silicate resinous or foamed product of this invention may vary, broadly speaking, with ranges as follows:
(a) 1 to 95 parts by weight of alkali metal polyester silicate resinous product;
(b) 50 parts by weight of polyisocyanate, polyisothiocyanate or isocyanate-terminated polyurethane prepolymer;
(c) up to 20% by weight of a foam stabilizer;
(d) up to 50% by weight of a chemically inert blowing agent, boiling within the range of from −25° C. to 80° C.;
(e) up to 10% by weight of an activator;
(f) up to 200 parts by weight of a water-binding agent.

Percentages are based on the weight of the alkali metal polyester silicate resinous product and polyisocyanate.

In the cases where the viscosity of the polyisocyanate is too high, it may be reduced by adding a low-viscosity isocyanate, or even by adding inert solvents such as acetone, diethyl ether of diethylene glycol, ethyl acetate and the like.

In cases where the curing agent contains an aqueous alkali silicate, it is preferred that the isocyanate-terminated polyurethane prepolymer be sulphonated. It is usually sufficient to react the isocyanate-terminated polyurethane prepolymer with concentrated sulphuric acid or oleum of sulfur trioxide in order to produce a sulphonated poly(urethane silicate)prepolymer containing the sulphonic group in the amount of 3–100 milliequivalents/100 g. The reaction will take place by thoroughly mixing the sulphuric acid or oleum or sulfur trioxide with the isocyanate-terminated polyurethane prepolymer at ambient temperature an pressure. In some cases where sulfur trioxide is used, an increased pressure is advantageous. The polyisocyanate may be modified to contain ionic groups before reacting with the polyester-silicate resinous products.

The sulphonated isocyanate-terminated polyurethane prepolymer can be directly mixed with an aqueous silicate solution, in which case the corresponding metal salt is formed in situ. The sulphonated poly(urethane silicate)prepolymer may be completely or partly neutralized at the onset by the addition of amines, metal alcoholates, metal oxides, metal hydroxide or metal carbonates.

Water-binding components may be used in this invention, including organic or inorganic water-binding substances which have, first, the ability to chemically combine, preferably irreversibly, with water and, second, the ability to reinforce the poly(urethane silicate) plastics of the invention. The term "water-binding component" is used herein to identify a material, preferably granular or particulate, which is sufficiently anhydrous to be capable of absorbing water to form a solid or gel such as mortar or hydraulic cement.

A water-binding component such as hydraulic cement, synthetic anhydrides, gypsum or burnt lime may be added to any of the components to produce a tough, somewhat flexible solid or cellular solid concrete. The water-binding component may be added in amounts from 0–200% by weight, based on the weight of Components a, b and c. When a water-binding agent is added and when the curing agent is an aqueous alkali metal silicate solution, a halogen or phosphorus-containing compound or mixture thereof may be added in the amount of 1% to 30% by weight, based on the weight of the reactants, Components a, b and c.

Suitable hydraulic cements are, in particular, Portland cement, quick-setting cement, blast-furnace Portland cement, mildburnt cement, sulphate-resistant cement, brick cement, natural cement, lime cement, gypsum cement, pozzolan cement and calcium sulphate cement. In general, any mixture of fine ground lime, alumina and silica that will set to a hard product by admixture of water, which combines chemically with the other ingredients to form a hydrate, may be used. There are many kinds of cement which can be used in the production of the compositions of the invention and they are so well known that a detailed description of cement will not be given here; however, one can find such a detailed description in Encyclopedia of Chemical Technology, Volume 4, Second Edition, Published by Kirk-Othmer, pages 684–710, of the type of cement which may be used in the production of this invention and are incorporated herein by reference.

Organic blowing agents may be used to improve or increase the foaming to produce cellular solid plasics such as acetone, ethyl acetate, methanol, ethanol, halogenated alkanes, e.g., methylene chloride, chloroform, ethylidene chloride, vinylidene chloride, monofluorotrichloromethane, chlorodifluoromethane, butane, hexane or diethyl ether. Compounds which decompose at temperatures above room temperature with liberation of gases, e.g., nitrogen, such as azo compounds, azoisobutyric acid nitrile, may also act as blowing agents. Compressed air may act as a blowing agent.

Other examples of blowing agents and details about the use of blowing agents are described in Kunststoff-Handbuch, Volume VII, published by Vieweg and Hochtlen, Carl-Hanser-Verlag, Munich, 1966, e.g., on pages 108 and 109, 453 to 455 and 507 to 510.

The proportions of the components may be adjusted to a highly cellular solid. When water is used, it reacts with the NCO group to produce $CO_2$ and pores are produced in the product by the evolved $CO_2$. In certain cases, the $CO_2$ is rapidly evolved and escapes before the product hardens, and a solid product can be produced, nearly completely free of air cells. When a high silicate content, from 80% to 99% by weight, is desirable, such as when the final product is required to have mainly the properties of an inorganic silicate plastic, in particular, high-temperature resistance and complete flame resistance, an alkali metal silicate may be added with Components a, b or c or be reacted with the polyisocyanate to produce a poly(urethane alkali silicate) prepolymer. In that case, the function of the polyisocyanate is that of a non-volatile hardener whose reaction product is a high-molecular-weight polymer which reduces the brittleness of the product.

When an alkali catalyst or alkali metal silicate is used in the invention, fine metal powders, e.g., powdered calcium, magnesium, aluminum or zinc, may also act as the blowing agents by bringing about the evolution of hydrogen. Compressed air may be mixed in the components and may also be used to mix the components, then be used as the blowing agent. These metal powders also have a hardening and reinforcing effect.

The properties of the foams (cellular solid) obtained from any given formulation, e.g., their density in the moist state, depends to some extent on the details of the mixing process, e.g., the form and speed of the stirrer and the form of the mixing chamber, and also the selected temperature at which foaming is started. The foams will usually expand 3 to 12 times their original volume.

The poly(urethane silicate) plastics produced by the invention have many uses. The reaction mixture, with or without a blowing agent, may be mixed in a mixing apparatus; then the reaction mixture may be sprayed by means of compressed air or by the airless spraying process onto surfaces; subsequently, the mixture expands and hardens in the form of a cellular solid which is useful for insulation, filling, and moisture-proofing coating. The foaming material may also be forced, poured or injection-molded into cold or heated molds, which may be relief molds or solid or hollow molds, optionally by centrifugal casting, and left to harden at room temperature or at temperatures up to 200° C., at ambient pressure or at elevated pressure. In certain cases, it may be necessary to heat the mixing or spraying apparatus to initiate foaming; then, once foaming has started, the heat evolved by the reaction between components continues the foaming until the reaction is complete. A temperature between 40° C. and 150° C. may be required to initiate foaming. The blowing agent is usually added to the polyisocyanate.

Reinforcing elements may quite easily be incorporated into the reaction mixtures. The inorganic and/or organic reinforcing elements may be, e.g., fibers, metal wires, foams, fabrics, fleeces or skeletons. The reinforcing elements may be mixed with the reaction mixtures, for example, by the fibrous web impregnation or by processes in which the reaction mixtures and reinforcing fibers are together applied to the mold, for example, by means of a spray apparatus. The shaped products obtainable in this way may be used as building elements, e.g., in the form of sandwich elements, either as such or after they have been laminated with metal, glass or plastics; if desired, these sandwich elements may be foamed. The products may be used as hollow bodies, e.g., as containers for goods which may be required to be kept moist or cool, as filter materials or exchanges, as catalyst carriers or carriers of other active substances, as decorative elements, furniture components and fillings or for cavities. They may be used in the field of model building and mold building, and the production of molds for metal casting may also be considered.

Instead of blowing agents, finely divided inorganic or organic hollow particles, e.g., hollow expanded beads of glass, plastics and straw, may be used for producing cellular solid products. These products may be used as insulating materials, cavity fillings, packaging materials, building materials which have good solvent resistance and advantageous fire-resistant characteristics. They may also be used as lightweight building bricks in the form of sandwiches, e.g., with metal-covering layers for house building and the construction of motor vehicles and aircraft.

Organic or inorganic particles which are capable of foaming up or have already been foamed may be incorporated in the fluid foaming reaction mixture, e.g., expanded clay, expanded glass, wood, cork, popcorn, hollow plastic beads such as beads of vinyl chloride polymers, polyethylene, styrene polymers or foam particles of these polymers or other polymers, e.g., polysulphone, polyepoxide, polyurethane, poly(urethane silicate) copolymers, urea-formaldehyde, phenol-formaldehyde or polyimide polymers, or, alternatively, heaps of these particles may be permeated with foaming reaction mixtures to produce insulation materials which have good fire-resistant characteristics.

The cellular solid products of the invention, in the aqueous or dry or impregnated state, may subsequently be lacquered, metallized, coated, laminated, galvanized, vapor treated, bonded or blocked. The cellular solid products may be sawed, drilled, planed, polished, or other working processes may be used to produce shaped products. The shaped products, with or without a filler, may be further modified in their properties by subsequent heat treatment, oxidation processes, hot pressing, sintering processes or surface melting or other compacting processes.

The novel cellular solid products of the invention are also suitable for use as constructional materials due to their toughness and stiffness, yet they are still elastic. They are resistant to tension and compression and have a high dimensional stability to heat and high flame resistance. They have excellent sound-absorption capacity, heat-insulating capacity, fire resistance, and heat resistance which makes them useful for insulation. The cellular products of this invention may be foamed on the building site and, in many cases, used in place of wood or hard fiber boards. Any hollow forms may be used for foaming. The brittle foams may be crushed and used as a filler, as a soil conditioner, as a substrate for the propagation of seedlings, cuttings and plants or cut flowers.

The foamed or solid concrete produced by reacting Components a, b and c and polyisocyanate with a water-binding component may be used as surface coatings having good adhesion and resistance-to-abrasion properties, as mortars, and for making molded products, particularly in construction engineering and civil engineering such as for building walls, igloos, boats and for roadbuilding, etc. These products are light-weight, thermal-insulating materials with excellent mechanical properties and fire-resistance. The amount of water-binding component used varies greatly, depending on the type of product desired, from 1% to 200% by weight, based on Components a, b and c and polyisocyanate. In certain cases, it is desirable to add sand and gravel in the amount of 1 to 6 parts by weight to each part by weight of the hydraulic cement. The mixture may be poured in place, troweled on or sprayed onto the desired surface to produce a solid or cellular solid product.

Fillers in the form of powders, granules, wire, fibers, dumb-bell shaped particles, crystallites, spirals, rods, beads, hollow beads, foam particles, non-woven webs, pieces of woven or knitted fabrics, tapes and pieces of foil of solid inorganic or organic substances, e.g., dolomite, chalk, alumina, asbestos, basic silicic acids, sand, talc, iron oxides, aluminum oxide and hydroxides, alkali metal silicates, zeolites, mixed silicates, calcium silicate, calcium sulphates, alumino silicates, cements, basalt wool or powder, glass fibers, carbon fibers, graphite, carbon black, Al, Fe, Cri and Ag powders, molybdenum sulphide, steel wool, bronze or copper meshes, silicon powder, expanded clay particles, hollow glass beads, glass powder, lava and pumice particles, wood chips, woodmeal, cork, cotton, straw, popcorn, coke or particles of filled or unfilled, foamed or unfoamed, stretched or unstretched organic polymers, may be added to the mixture of the Components a, b and c in many applications. Among the numerous organic polymers which may be used, e.g., as powders, granules, foam particles, beads, hollow beads, foamable (but not-yet-foamed) particles, fibers, tapes, woven fabrics, or fleeces, the following may be mentioned as examples: polystyrene, polyethylene, polypropylene, polyacrylonitrile, polybutadiene, polyisoprene, polytetrafluorethylene, aliphatic and aromatic polyesters, melamine, urea, phenol resins, phenol silicate resins, polyacetal resins, polyepoxides, polyhydantoins, polyureas, polyethers, polyurethanes, polyimides, polyamides, polysulphones, polycarbonates and copolymers thereof.

The composite materials, according to the invention, may be mixed with considerable quantities of fillers without losing their advantageous properties, and, in particular, composite materials which consist predominantly of organic constituents which are preferably filled with inorganic fillers; where silicate constituents predominate, it is preferably filled with organic fillers. Fillers which are particularly preferred are chalk, talc, dolomite, gypsum, clay, anhydrite, glass, carbon and the conventional plastics and rubber waste.

In the production of surface coatings, bonds, putties or interlayers, particularly in the case of porous materials, it is preferred to use polyisocyanates which have only a low isocyanate content, e.g., less than 5%, or prepolymers which are free from isocyanate groups. The mixtures obtained in this way have a long pot life and may be applied in thin layers which gradually harden in the course of time. The liberated $CO_2$ acts as the curing agent. In a two-stage or multistage hardening in which, for example, an excess of water is used, there is a rapid evolution of $CO_2$ and the poly(urethane silicate)resinous product is converted into a workable form which may be used as putties, coating agents, grouting materials or mortar. This thermoplastic form may also be injection-molded, extruded or worked-up in a kneader.

In many cases, the poly(urethane silicate) resinous and foamed products produced by the invention are soluble in organic solvents and may be used as a tough coating agent for wood and metal. The mixtures of the invention are also suitable for use as impregnating agents for finishing fibers. The mixtures may also be extruded through dies or slots and converted into fibers and foils. These fibers and foils may be used for producing synthetic incombustible paper or fleeces.

When the alkali metal polyester silicate and polyisocyanate are combined with expanded clay and an alkali metal silicate solution, a very good concrete is obtained which can, for example, be used as panels in the construction field. In this case, the foam material (expanded clay) plays the part of the binding material.

DESCRIPTION OF PREFERRED EMBODIMENTS

My invention will be illustrated in greater detail by the specific Examples which follow, it being understood that these preferred embodiments are illustrative of, but not limited to, procedures which may be used in the production of alkali metal polyester silicate resinous products. Parts and percentages are by weight unless otherwise indicated.

EXAMPLE 1

About 10 parts by weight of sodium metasilicate pentahydrate, about 30 parts by weight of phthalic anhydride and 10 parts by weight of glycerol are mixed, then heated to a temperature between the melting point of phthalic acid and the boiling point of glycerol while agitating for 20 to 90 minutes. The temperature may then be gradually increased, up to 250° C., until the desired viscosity is obtained, thereby producing a cream-colored alkali metal silicate polyester silicate resinous product.

EXAMPLE 2

About 20 parts by weight of an aqueous solution of sodium silicate, containing 10 parts by weight of anhydrous sodium silicate, 30 parts by weight of phthalic acid, 5 parts by weight of glycerol and 10 parts by weight of ethylene glycol, are mixed, then heated to a temperature between the melting temperature of phthalic acid and the boiling temperature of ethylene glycol while agitating for 20 to 90 minutes. The temperature is then gradually increased, up to 250° C., while agitating until the desired viscosity is obtained, thereby producing an alkali metal polyester silicate resinous product.

Other glycols may be used in place of ethylene glycol such as propylene glycol, diethylene glycol, butylene glycol, dipropylene glycol, polyethylene glycol, polypropylene glycol, and mixtures thereof.

Other organic triols may be used in place of glycerol such as trimethylol propane, hexane-1,2,6-triol, butane-1,2,4-triol, trimethyl ethane and mixtures thereof.

EXAMPLE 3

About 10 parts by weight of potassium metasilicate pentahydrate, 15 parts by weight of phthalic anhydride, 15 parts by weight of maleic anhydride, 5 parts by weight of glycerol and 10 parts by weight of propylene glycol are mixed, then heated to a temperature between the melting temperature of the polycarboxyl acids and the boiling temperature of the polyols while agitating for 20 to 90 minutes, thereby producing an alkali metal polyester silicate resinous product. The temperature is then gradually increased, up to 250° C., while agitating until the desired viscosity is obtained. The resinous product may be produced as a thick liquid or a hard solid.

The thick liquid (viscosity of 500 to 1,500 poises) is mixed with styrene in the ratio of about 2 to 1 parts by weight. Then a catalytic amount of a peroxide initiator, methyl ethyl ketone peroxide (0.2 to 0.5 part by weight), and an activator, cobalt naphthenate (30 to 100 ppm of cobalt metal), are added and mixed at a temperature of 20° C. to 60° C., thereby producing a hard, solid condensation product. The above solution may be applied to a fiber glass cloth to produce rigid sheets and may be used to build containers, roofing, etc.

EXAMPLE 4

About 10 parts by weight of sodium metasilicate pentahydrate, 15 parts by weight of glycerol and 30 parts by weight of phthalic anhydride are mixed, then heated to a temperature just below the boiling temperature of glycerol (150° C. to 250° C.) for 20 to 90 minutes while agitating at ambient pressure, thereby producing a cream-colored alkali metal polyester silicate resinous product.

A mineral acid, sulfuric acid, is then added slowly to the alkali metal polyester silicate resinous product in the amount wherein the sulfuric acid and alkali metal radicals are about equal, while agitating, thereby producing a polyester silicate resinous product. This product is soluble in common solvents such as acetic acid and the solution of polyester silicate may be painted on wood to produce a tough, protective coating when dried.

Other polycarboxylic acids may be used in place of phthalic anhydride, such as phthalic acid, maleic acid, maleic anhydride, succinic acid, succinic anhydride, glutaric anhydride, glutaric acid, poly(adipic anhydride), adipic acid, tetrachlorophthalic anhydride, diglycolic anhydride, fumaric acid, azelaic acid, sebacic acid, terephthalic acid, oxalic acid, itaconic acid, nitrophthalic acid anhydride, pyromellitic anhydride, tetrahydrophthalic anhydride, dodecenylsuccinic anhydride, hexadecylsuccinic anhydride and mixtures thereof.

EXAMPLE 5

About 20 parts by weight of the alkali metal polyester silicate resinous product, as produced in Example 1, 10 parts by weight of polypropylene glycol (mol. wt. 1200) and 20 parts by weight of "crude MDI" (polyphenyl-polymethylene-isocyanates) are mixed, then 1 part by weight of "Eurithane 51" produced by Upjohn is admixed thoroughly and the mixture expands 8 to 15 times its original volume, thereby producing a tough, semi-rigid polyurethane silicate foam with excellent fire-retardant properties.

Other polyols (polyhydroxyl organic compounds) may be used in place of polypropylene glycol, such as polyesters, polyethers, polyamides, polythioethers, polyacetals, polybutadiene, phenoplast and aminoplasts containing 2 or more hydroxyl radicals, castor oil, carbohydrates, cellulose, modified polyethers with vinyl compounds, and mixtures thereof.

EXAMPLE 6

About 20 parts by weight of the alkali metal polyester silicate resinous product, as produced in Example 2, 4 parts by weight of trichlorotrifluoroethane, 0.5 part by weight of "DABCO 33LV" produced by Air Products and 15 parts by weight of a polyurethane prepolymer, as listed below, are thoroughly mixed at a temperature between ambient temperature and 45° C. The mixture expands 3 to 15 times its original volume, producing a rigid polyurethane silicate foam which has excellent flame-retardant and insulation properties. The foam may be used for packaging and for sound and thermal insulation.

| Example | Polyurethane Prepolymer |
|---|---|
| a | toluene diisocyanate with polypropylene glycol (mol. wt. 500) in an NCO/OH ratio of 25:1. |
| b | diisocyanatodiphenylmethane with a tetrafunctional polypropylene glycol (mol. wt. 500) to produce a prepolymer having about 22% NCO groups. |
| c | methylene bis-phenyl diisocyanate with a liquid polyepichlorohydrin to produce a prepolymer of NCO of about 16% and containing 25% by weight of a resin extender, polyalpha-methyl styrene. |
| d | toluene diisocyanate with castor oil to produce a prepolymer with an NCO content of about 15%. |

EXAMPLE 7

About 10 parts by weight of sodium metasilicate, 10 parts by weight of glycerol, 5 parts by weight of linseed oil, 5 parts by weight of sebacic acid and 20 parts by weight of phthalic anhydride are mixed in a container equipped with a reflux condenser, agitator, sparger, a foam breaker and has suitable means for sampling and discharge. The reaction may be carried out in an inert atmosphere, usually carbon dioxide or nitrogen. A vacuum may be applied to the reactor to remove the water. The mixture is heated to 150° C. to 250° C. while agitating for 20 to 90 minutes, thereby producing an alkali metal polyester silicate resinous product.

EXAMPLE 8

About 10 parts by weight of sodium metasilicate pentahydrate, 10 parts by weight of glycerol and 20 parts by weight of adipic acid are mixed, then heated to a temperature between the melting point of adipic acid and the boiling temperature of glycerol while agitating for 20 to 90 minutes, thereby producing a thick liquid alkali metal polyester silicate resinous product.

About equal parts by weight of the alkali metal polyester silicate resinous product and a polyisocyanate, as listed below, and 5% by weight of triethylamine are mixed at 30° C. to 45° C., then thoroughly agitated until the mixture begins to expand, thereby producing a rigid polyurethane silicate foam.

| Example | Polyisocyanate |
|---|---|
| a | tolylene diisocyanate. |
| b | "TDI" (tolylene diisocyanate) produced by Olin Chemical. |
| c | "MDI", 4,4'diphenylmethane diisocyanate |
| d | "PAPI 27" (a dark-brown low viscosity polymethylene polyphenylisocyanate having an average functionality of 2.6) produced by Upjohn Co. |
| e | "ISONATE 143L" (a light-yellow low viscosity, modified diphenylmethane diisocyanate |

| Example | Polyisocyanate |
|---|---|
| | containing a high percentage of pure diphenylmethane diisocyanate) produced by Upjohn Co. |
| f | 20% solution of "TDI" (tolylene diisocyanate) residue in "crude MDI" (polyphenyl-polymethane-isocyanates) with NCO content of about 30%. |
| g | "ISONATE 181" (a light yellow medium viscosity, modified diphenylmethane diisocyanate with an isocyanate of 23%) produced by Upjohn Co. |
| h | "FASTCAST ARPRO A" an MDI(4,4' diphenylmethane diisocyanate) produced by Arnco. |
| i | 4,4'-diphenylmethane diisocyanate. |
| j | sulphonated polyphenyl-polymethylene polyisocyanate, sulfur content of about 1% and NCO content of about 30%. |
| k | tolylene diisocyanate silicate propllymer (100 parts by weight of "TDI" a tolylene diisocyanate with 10 parts by weight of hydrated silica). |
| l | sodium silicate-tolylene diisocyanate propolymer (100 parts by weight of "TDI" a tolylene diisocyanate with 20 parts by weight of sodium metasilicate). |

EXAMPLE 9

About 10 parts by weight of the alkali metal polyester silicate produced in Example 3, 5 parts by weight of an amine polyether sucrose (POLY G 71-357 produced by 01 in), 5 parts by weight of methylene chloride, 15 parts by weight of "MDI" (4,4'-diphenylmethane diisocyanate) 30 parts by weight of fine sand and 30 parts by weight of Portland cement are mixed thoroughly, then poured into a mold, such as a cement block mold, where the mixture expands 5 to 15 times its original volume and hardens within 5 minutes to produce a hard, rigid polyurethane silicate resinous product. After the product has hardened, it is then placed in water to wet the product thoroughly in order to cure any unreacted cement. The product has excellent flame-retardant properties and is a fine sound and thermal insulator.

Other water-binding agents may be used in place of Portland cement such as other hydraulic cements, synthetic anhydrides, gypsum, burnt lime and mixtures thereof.

EXAMPLE 10

About 30 parts by weight of the alkali metal polyester silicate, as produced in Example 3, 10 parts by weight of methyl methacrylate, 0.2 to 0.5 part by weight of methyl ethyl ketone peroxide and sufficient cobalt naphthanate to produce 100 ppm are mixed at ambient pressure and at a temperature between 20° C. and 60° C., thereby producing a tough, solid alkali metal polyester silicate resinous product.

EXAMPLE 11

About 30 parts by weight of the alkali metal polyester silicate, as produced in Example 3, 10 parts by weight of styrene, 0.2 to 0.5 part by weight of methyl ethyl ketone, sufficient cobalt naphthanate to produce 100 ppm, 0.2 part by weight of "DABCO R 8020" (a low viscosity liquid amine catalyst) produced by Air Products, 5 parts by weight of trichlorotrifluoroethane and 20 parts by weight of "crude MDI" (polyphenyl-polymethylene-isocyanates) are thoroughly mixed at ambient temperature up to 35° C. The mixture expands in a few seconds to 5 to 15 times its original volume, thereby producing a tough, rigid polyurethane silicate foam.

Although specific materials and conditions were set forth in the above examples, these were merely illustrative of preferred embodiments of my invention. Various other compositions, such as the typical materials listed above may be used, where suitable. The reactive mixtures and products of my invention may have other agents added thereto to enhance or otherwise modify the reaction and products.

Other modifications of my invention will occur to those skilled in the art upon reading my disclosure. These are intended to be included within the scope of my invention, as defined in the appended claims.

I claim:

1. The process for the production of alkali metal polyester silicate resinous product by the following steps:
   (a) mixing 1 to 10 parts by weight of alkali metal silicate, 10 to 30 parts by weight of a polyhydroxyl organic compound and 10 to 30 parts by weight of a polycarboxylic acid and/or a polycarboxylic acid anhydride,
   (b) heating the mixture at a temperature between the melting temperature of the polycarboxylic acid and the boiling temperature of the polyhydroxyl organic compound while agitating for 20 to 90 minutes, thereby
   (c) producing an alkali metal polyester siicate resinous product.

2. The process of claim 1 wherein the alkali metal silicate is selected from the group consisting of sodium silicate, potassium silicate, lithium silicate and mixtures thereof.

3. The process of claim 1 wherein the alkali metal silicate is sodium silicate.

4. The process of claim 1 wherein the polyhydroxyl organic compound is selected from the group consisting of ethylene glycol, propylene glycol, butylene glycol, trimethylene glycol, tetramethylene glycol, pentamethylene glycol, hexamethylene glycol, diethylene glycol, triethylene glycol, polyethylene glycol, polypropylene glycol, polybutylene glycol, bis($\beta$-hydroxyethyl)terephthalate, Bisphenol A, resorcinol, glycerol, di- and tripentaerythritol, trimethylol propane, glycerol monochlorohydrin, trimethyol ethane, carbohydrates and mixtures thereof.

5. The process of claim 1 wherein the polycarboxylic acid and/or polycarboxylic acid anhydride is selected from the group consisting of maleic acid, phthalic acid, succinic acid, oxalic acid, malonic acid, glutaric acid, adipic acid, pimelic acid, suberic acid, isophthalic acid, fumaric acid, azelaic acid, sebacic acid, terephthalic acid, itaconic acid, diglycolic acid, tartaric acid, phthalic acid anhydride, maleic acid anhydride, succinic acid anhydride, glutaric acid anhydride, poly(adipic anhydride)tetrachlorophthalic acid anhydride, pyromellitic anhydride, tetrahydrophthalic anhydride, dodecenylsuccinic acid anhydride, hexadecylsuccinic anhydride, nitrophthalic acid anhydride and mixtures thereof.

6. The produced, alkali metal polyester silicate resinous product, as produced by the process of claim 1.

* * * * *